(12) United States Patent
Spampatti et al.

(10) Patent No.: US 10,100,868 B2
(45) Date of Patent: Oct. 16, 2018

(54) SCREW WITH A COMPOUND-SQUEEZING PISTON

(71) Applicant: Hilti Aktiengesellschaft, Schaan (LI)

(72) Inventors: Matteo Spampatti, Buchs (CH); Huu Toan Nguyen, Wasserburg (DE)

(73) Assignee: Hilti Aktiengesellschaft, Schaan (LI)

( * ) Notice: Subject to any disclaimer, the term of this patent is extended or adjusted under 35 U.S.C. 154(b) by 17 days.

(21) Appl. No.: 15/129,302

(22) PCT Filed: Mar. 31, 2015

(86) PCT No.: PCT/EP2015/056944
§ 371 (c)(1),
(2) Date: Sep. 26, 2016

(87) PCT Pub. No.: WO2015/150351
PCT Pub. Date: Oct. 8, 2015

(65) Prior Publication Data
US 2017/0122360 A1    May 4, 2017

(30) Foreign Application Priority Data

Apr. 1, 2014 (EP) .................................... 14163055

(51) Int. Cl.
*F16B 39/02* (2006.01)
*F16B 39/22* (2006.01)

(52) U.S. Cl.
CPC ................................. *F16B 39/225* (2013.01)

(58) Field of Classification Search
CPC ...................................................... F16B 39/225
USPC ............ 411/82, 82.3, 930; 405/302.1, 259.5, 405/259.6
See application file for complete search history.

(56) References Cited

U.S. PATENT DOCUMENTS

| | | | | |
|---|---|---|---|---|
| 2,092,341 A | * | 9/1937 | De Vries | F16B 13/143 248/231.91 |
| 3,434,743 A | * | 3/1969 | Boeker | E21B 33/04 285/321 |
| 3,472,301 A | | 10/1969 | Pearce | |
| 4,055,051 A | * | 10/1977 | Finney | E21D 20/026 175/226 |
| 4,224,971 A | * | 9/1980 | Muller | F16B 13/143 156/305 |
| 4,475,329 A | * | 10/1984 | Fischer | F16B 13/0858 405/259.1 |

(Continued)

FOREIGN PATENT DOCUMENTS

| | | |
|---|---|---|
| DE | 1101324 B | 3/1961 |
| DE | 19820671 A1 | 11/1999 |

(Continued)

OTHER PUBLICATIONS

International Search Report of PCT/EP2015/056944 dated Jun. 24, 2015, 3 pages.

*Primary Examiner* — Gary W Estremsky
(74) *Attorney, Agent, or Firm* — Davidson, Davidson & Kappel, LLC

(57) ABSTRACT

A screw, especially a concrete screw, having a shank with a front end that is to be inserted into a hole drilled into a substrate, and a rear end as well as at least one thread arranged on the shank. It is provided that the screw has a squeezing piston that is situated in front of the front end of the shank, whereby a compound reservoir is provided between the squeezing piston and the shank.

12 Claims, 2 Drawing Sheets

(56) References Cited

U.S. PATENT DOCUMENTS

| | | | |
|---|---|---|---|
| 4,564,315 A | 1/1986 | Rozanc | |
| 5,544,980 A * | 8/1996 | Seegmiller | E21D 20/025 405/259.1 |
| 6,017,176 A * | 1/2000 | Marui | F16B 37/048 411/258 |
| 6,896,462 B2 | 5/2005 | Stevenson et al. | |
| 8,439,220 B2 * | 5/2013 | Norman | F01D 11/00 220/228 |
| 2005/0058521 A1 * | 3/2005 | Stevenson | F16B 13/002 411/82 |
| 2007/0167063 A1 * | 7/2007 | Nilsen | F16B 7/06 439/348 |
| 2011/0070034 A1 * | 3/2011 | Schmidt | E21D 21/0013 405/259.1 |
| 2012/0155971 A1 * | 6/2012 | Schmidt | E21D 20/023 405/259.6 |

FOREIGN PATENT DOCUMENTS

| | | |
|---|---|---|
| DE | 102007017556 | 10/2008 |
| DE | 202008001093 | 6/2009 |
| DE | 102011003127 A1 | 7/2012 |
| EP | 0245865 B1 | 7/1989 |
| GB | 1520545 | 10/1978 |
| GB | 2017247 | 10/1979 |
| JP | H08135026 | 5/1996 |
| WO | WO2008053542 | 5/2008 |

* cited by examiner

Fig. 5
Fig. 6
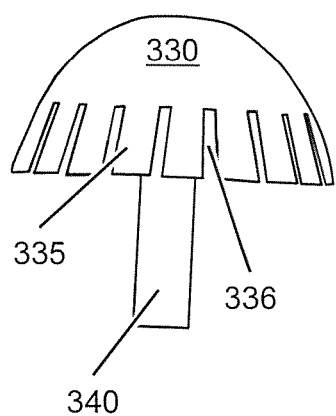
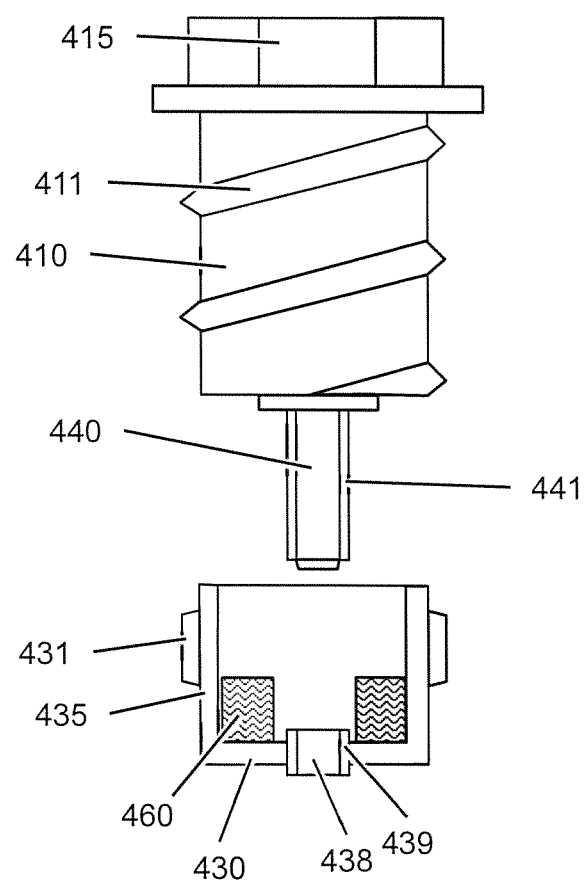
Fig. 7
Fig. 8
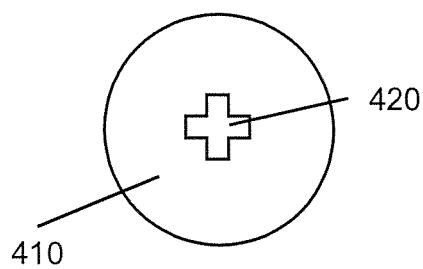
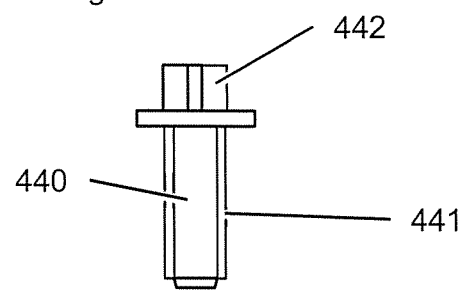

SCREW WITH A COMPOUND-SQUEEZING PISTON

The invention relates to a screw, especially a tapping screw. Such a screw has a shank with a front end that is to be inserted into a hole drilled into a substrate, and a rear end as well as at least one thread arranged on the shank.

BACKGROUND

German patent application DE 198 20 671 A1 discloses a method for anchoring a tapping screw in a hole drilled into concrete, whereby first the hole is drilled and then a mortar compound is inserted into the drilled hole. Subsequently, the tapping screw is screwed into the drilled hole, a process in which the tip of the tapping screw dips into the mortar compound and displaces some of the mortar compound back along the shank, in other words, towards the opening of the drilled hole. The final outcome is for the entire drilled hole to be filled with the mortar compound so that the tapping screw is surrounded by the hardened mortar compound.

German patent application DE 10 2011 003127 A1 describes another method for anchoring a tapping screw. This patent application proposes inserting an adhesive cartridge into the drilled hole so that it is crushed by the screw when the latter is screwed in. This then releases the adhesive. The use of a stop drill bit is meant to ensure that the drilled hole is of a defined depth. In this manner, according to DE 10 2011 003127 A1, it is possible to dispense with a conceivably costly adhesive metering procedure during the placement of the screw.

SUMMARY OF THE INVENTION

It is an object of the present invention to provide a screw that can be screwed in particularly easily and reliably while also achieving excellent load values and outstanding reliability.

A screw according to the invention is characterized in that it has a squeezing piston that is situated in front of the front end of the shank, whereby a compound reservoir is provided between the squeezing piston and the shank.

An idea of the invention resides in providing the screw with a compound reservoir, especially an adhesive reservoir, as well as a squeezing piston that squeezes out the compound reservoir into a drilled hole, so that the compound contained in the reservoir ends up between the shank and the wall of the drilled hole. In particular, the screw is configured in such a way that the squeezing piston moves towards the shank while the screw is being tightened. As a result, the volume between the squeezing piston and the shank is reduced so that the compound reservoir, which is situated between the squeezing piston and the shank, is squeezed out. In other words, the invention can create an adhesive screwed connection so that very high load values can be obtained. In this context, according to the invention, a defined volume of compound is prescribed to the user, and this translates into a high level of reliability. At the same time, the process for the placement of the screw according to the invention becomes very easy for the user. After all, since the compound according to the invention can be applied automatically and directly while the screw is being put in place, there is no need for an additional work step in order to insert the compound into the drilled hole by means of a separate pump.

It is especially advantageous for the screw to be a tapping screw, in other words, a screw whose at least one thread can cut its own mating thread in the substrate in which there is a drilled hole. In particular, the screw can be a concrete screw, that is to say, a screw with which the at least one thread can cut its own mating thread in a concrete substrate. Fundamentally, however, the invention could also be employed with screws that are being screwed into an existing internal thread.

The compound reservoir advantageously contains a free-flowing compound that, under pressure from the squeezing piston, can flow out of the compound reservoir into the annular gap that exists between the shank and the wall of the drilled hole. In particular, this can be a curable compound that preferably hardens after it has flowed between the shank and the wall of the drilled hole. Therefore, the compound can especially be a free-flowing, curable filling compound. This compound can be, for instance, a multi-component synthetic-resin mortar on the basis of polyester resin or epoxy resin that is activated when the components are mixed together. In this case, the components in the compound reservoir can be present separate from each other and become mixed when they are squeezed out. Preferably, the compound is a curable adhesive. The adhesive is preferably activated by pressure, for example, by the pressure exerted by the squeezing piston. In this manner, the adhesive can be activated by the action of the squeezing piston and can subsequently harden between the shank and the wall of the drilled hole. However, the adhesive can also be activated only once there is pressure between the shank and the wall of the drilled hole. The adhesive can also be a microencapsulated adhesive that is activated when the microencapsulation is broken. Preferably, the compound reservoir is arranged on the squeezing piston.

On the shank, there can be one or more threads that project radially from the shank. The thread begins especially from the front end of the shank. The thread and the shank here are preferably seen as separate parts here. At the rear end of the shank, there is preferably a load-application element that serves to introduce tensile forces into the shank, for example, the head of a screw that extends beyond the cross section of the shank. When it comes to the axial, radial and circumferential directions, these terms can refer especially to the longitudinal axis of the shank. The shank can be configured so as have an at least approximately cylindrical shape and/or to be made of metal. The squeezing piston can be made, for instance, of plastic, which can be advantageous in terms of the production effort involved.

Fundamentally, it can be provided that the squeezing piston comes to rest against the bottom of the drilled hole during the placement procedure, thus becoming axially secured by the bottom of the drilled hole. When the screw is tightened further, the volume that exists between the axially stationary squeezing piston and the axially advancing shank is reduced, so that compound is squeezed out of the compound reservoir. This translates into a structurally very simple configuration of the screw in which the squeezing piston can be joined to the shank, for instance, by means of a smooth threaded rod. However, it is often necessary to work with a defined depth of the drilled hole.

Especially preferably, the squeezing piston is joined to the shank by means of a threaded rod. In particular, a spindle drive can be formed on the threaded rod and it can convert a rotation of the shank relative to the squeezing piston into a translatory movement of the squeezing piston relative to the shank. As a result, the placement procedure can be further automated and thus simplified since easy-to-execute movements on the screw can be converted into an actuation movement of the squeezing piston. Since, according to this embodiment, the squeezing piston is actuated by the spindle drive and, as a rule, not or only partially by the bottom of the drilled hole, it is also possible to work with drilled holes of variable depths, which further simplifies the placement procedure. In particular, it can be ensured that the correct amount of compound is automatically dispensed so that the shank and/or the thread can be optimally wetted. The spindle drive is preferably formed by the thread of the threaded rod and by a mating internal thread, whereby the thread of the threaded rod engages with the mating internal thread, and whereby the mating internal thread can be arranged on the squeezing piston or on the shank, depending on the embodiment.

The threads of the spindle drive can be present from the beginning. It is also possible for one of the threads to only be cut during the placement procedure. For this purpose, for instance, the threaded rod can be made of a softer material than the internal thread into which it is being screwed, so that the external thread of the threaded rod is only created during the placement procedure.

In particular, it can be provided that the spindle drive converts the rotation of the shank relative to the squeezing piston in the screwing direction of the at least one thread into a translatory movement wherein the squeezing piston approaches the shank. According to this embodiment, the rotational movement while the screw is being tightened can move the squeezing piston towards the shank, that is to say, it can approach the shank, so that the compound is squeezed out of the compound reservoir. The term "screwing direction of the thread" refers especially to the rotational direction with which the shank with the thread is screwed into a substrate by the front end of the shank.

For instance, the threaded rod can be arranged non-rotatably on the squeezing piston, and the shank can have an internal thread into which the threaded rod is screwed. Accordingly, the spindle drive is formed between the threaded rod and the shank. Since, in this embodiment, the threaded rod can be screwed into the shank during the squeezing procedure, it is particularly easy to create designs that can make do with very shallow drilled holes. In particular, the threaded rod can be configured in one piece with the squeezing piston, which can further reduce the production work involved. The squeezing piston and/or the threaded rod can be made, for instance, of plastic.

In an alternative embodiment, the threaded rod is arranged non-rotatably on the shank, and the squeezing piston has an internal thread into which the threaded rod is screwed. Accordingly, the spindle drive is formed between the threaded rod and the squeezing piston. This can be very advantageous from the standpoint of the production since the internal thread does not have to be made on the shank, which is often relatively hard due to its function. In particular, it can be provided that the threaded rod and the shank are separate parts. This measure can reduce the production effort even further, and the functionality can be further improved. For example, the shank can be made of metal and/or the threaded rod can be made of plastic. In particular, the threaded rod can be configured so as to be axially compressible, so that it is possible to work with very shallow drilled holes.

If the threaded rod is non-rotatably arranged on the shank, it is also particularly preferable for the threaded rod and the shank to be coupled to each other by means of a non-rotatable plug-in connector. This non-rotatable plug-in connector can non-rotatably couple the threaded rod and the shank with a positive fit. For example, at the end face of the shank, there can be a cutout into which a projecting mating profile engages with the threaded rod. The cutout and/or the projecting mating profile can be configured, for instance, so as to be cruciform. In addition to the non-rotatable plug-in connector, as an additional fixation, especially in the axial direction, or else as an alternative to the plug-in connector, the threaded rod and the shank can also be integrally bonded to each other, for example, they can be glued together.

It is especially preferable for the squeezing piston to project radially beyond the shank, at least in certain sections. According to this embodiment, the squeezing piston projects radially beyond the shank in at least one place when the shank is viewed from the front as seen along its longitudinal axis. As a result, it is very easy to establish a highly effective frictional connection between the squeezing piston and the wall of the drilled hole. This connection, in turn, can bring about a rotational movement of the squeezing piston relative to the shank when the screw is being tightened, and this movement can then be converted into an automatic squeezing movement by means of the spindle drive during the tightening procedure. In particular, the squeezing piston can have at least one thread section that projects radially. This allows the rotational movement of the squeezing piston relative to the shank to be set very precisely.

It likewise preferable for the squeezing piston to have a sealing collar whereby, preferably, sections of the front end of the shank are accommodated in the sealing collar. According to this embodiment, the squeezing piston can form a half-shell in which sections of the shank are accommodated. This translates into a very well-defined flow of the compound.

The invention also relates to a method for the placement of a screw according to the invention. With this method, the screw is screwed into a hole drilled into a substrate, whereby preferably the at least one thread cuts a mating thread into the substrate, and whereby the squeezing piston squeezes compound out of the compound reservoir.

BRIEF DESCRIPTION OF THE DRAWINGS

The invention will be elaborated upon below on the basis of preferred embodiments that are schematically depicted in the accompanying figures, whereby individual features of the embodiments shown below can fundamentally be implemented individually or else in any desired combination within the scope of the invention. The figures schematically show the following:

FIG. 5: a side view of another modified squeezing piston for a screw according to FIG. 1;

FIG. 6: a side view of a second embodiment of a screw according to the invention, whereby, for the sake of clarity, the squeezing piston is shown separated from the screw;

FIG. 7: a view of the shank from FIG. 6, from the front; and

FIG. 8: a side view of the threaded rod from FIG. 6, separated from the shank of the screw.

DETAILED DESCRIPTION

Figure 1:
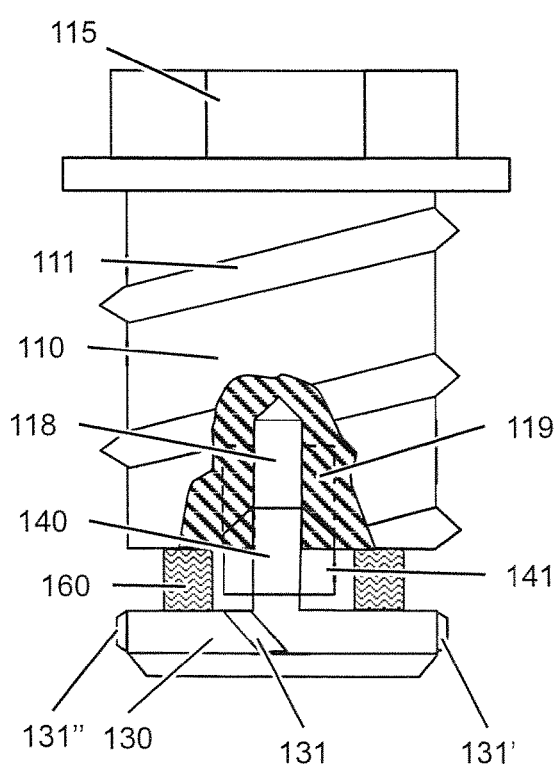
FIG. 1: a partially cutaway side view of a first embodiment of a screw according to the invention.
Figure 2:
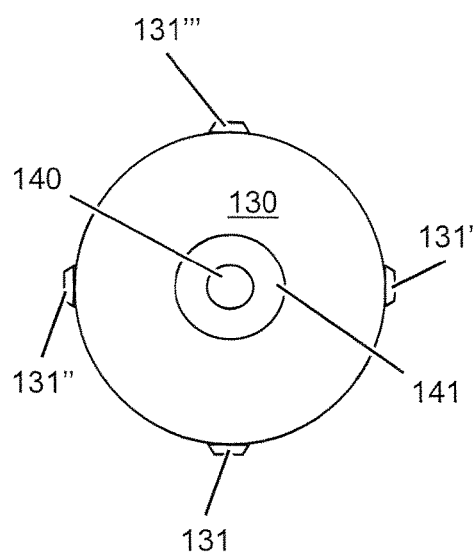
FIG. 2: a top view of the squeezing piston of the embodiment from FIG. 1, from the rear.

A first embodiment of the screw according to the invention is shown in FIGS. 1 and 2. The screw has an approximately cylindrical shank 110 on whose rear end there is a load-application element that is shown by way of an example as a screw head 115 and that serves to introduce tensile forces into the shank 110. There is a helical tapping thread 111 that starts in the area of the front end of the shank 110 on the circumferential surface of the shank 110. In the front end face of the shank 110, there is a bore 118 that has an internal thread 119. The function of these elements 118, 119 will be explained in detail below.

A squeezing piston 130, shown here as being disk-shaped by way of an example, is situated in front of the front end of the shank 110. A threaded rod 140 having an external thread 141 is non-rotatably arranged on the squeezing piston 130. This threaded rod 140 with its the external thread 141 is screwed into the internal thread 119 of the shank 110. Four radially projecting thread sections 131, 131', 131", 131''' are arranged on the circumferential surface of the squeezing piston 130. Situated axially between the shank 110 and the squeezing piston 130, there is a compound reservoir 160 that is shown here as being ring-shaped by way of an example and that contains a curable compound, especially a filling compound and/or an adhesive compound.

When the screw is being screwed into a hole drilled in a substrate, the thread sections 131, 131', 131", 131''' come into contact with the wall of the drilled hole and bring about a rotation of the squeezing piston 130 relative to the shank 110. The internal thread 119 present on the shank and the external thread 141 that is non-rotatably joined to the squeezing piston 130 form a spindle drive that converts this relative rotation into a translatory movement wherein the squeezing piston 130 approaches the shank 110. The compound reservoir 160 is axially compressed during this linear approach movement. As a result, in turn, compound is squeezed out of the compound reservoir 160 and during the further tightening procedure, it then reaches the circumferential surface of the shank 110, where it hardens once the tightening procedure has been completed.

The interplay between the lead angle of the threads 111, 141 and 119 defines the squeezing rate of the compound that is dispensed during the placement procedure. In particular, it can be provided that the external thread 141 of the threaded rod 140 runs in the same direction as the thread 111 on the shank 110.

The lead angle of the thread sections 131, 131', 131", 131''' can be between −90° and +90° and it is an additional component that can influence a rotational movement of the bore relative to the squeezing piston 130. Therefore, the volume of the compound can be further regulated by means of a positive or negative angle. If the thread sections 131, 131', 131", 131''' run in the same direction as the thread 111, then the squeezing piston 130 can dispense less compound and vice versa.

Figure 3:
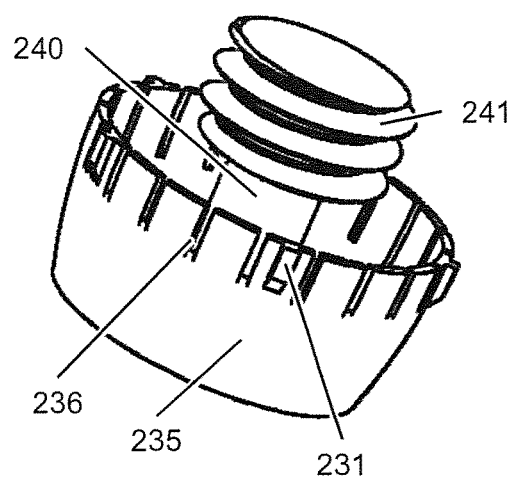
FIG. 3: a perspective view of a modified squeezing piston for a screw according to FIG. 1.
Figure 4:
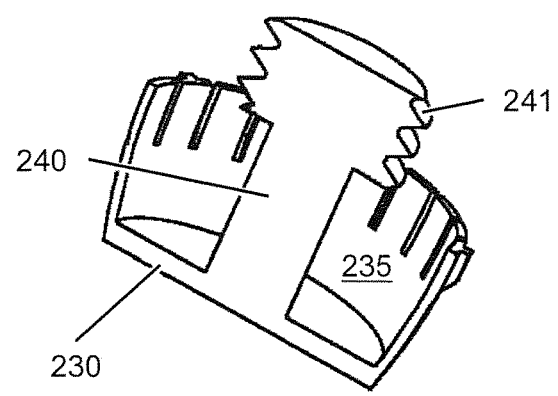
FIG. 4: a cutaway view of the squeezing piston from FIG. 3.

FIGS. 3 and 4 show another embodiment of a squeezing piston 230 for the screw shown in FIGS. 1 and 2. As was the case in FIGS. 1 and 2, the squeezing piston 230 of FIGS. 3 and 4 is likewise configured so as to be disk-shaped and it has a non-rotatable threaded rod 240 with an external thread 241 that is to be screwed into the internal thread 119 of the shank 110. In the embodiment of FIGS. 3 and 4, however, the squeezing piston 230 has an additional ring-shaped sealing collar 235 in the form of a cylindrical jacket. The sealing collar 235 starts at the squeezing piston 230, annularly surrounds the threaded rod 240, and subsequently extends to the shank 110, and can accommodate the end of the shank 110 at least partially. The flow of compound can be systematically regulated by means of the sealing collar 235. The sealing collar 235 has a plurality of notches 236 which start at the end of the sealing collar 235 that faces the shank 110 and that faces away from squeezing piston 230. These notches 236 can serve as passage openings for the compound and/or can facilitate the insertion of the shank 110 into the sealing collar 235. Also in the embodiment shown in FIGS. 3 and 4, thread sections 231 are provided which, however, are arranged on the sealing collar, preferably at the height of the notches 236.

FIG. 5 shows another embodiment of a squeezing piston 330 for the screw shown in FIGS. 1 and 2. In the embodiment shown in FIG. 5, the squeezing piston 330 is not configured as a flat disk, but rather, so as to be curved, which can improve the incorporation of the flow even further. The embodiment of FIG. 5 likewise has a sealing collar 335 with notches 336 at the ends, whereby the curved sealing collar 335 of FIG. 5 continuously adjoins the curved squeezing piston 330.

The rod 340 that is non-rotatably arranged on the squeezing piston 330 is shown here by way of an example without an external thread. In this case, when the squeezing piston 330 reaches the bottom of the drilled hole into which the screw is being placed, it can be moved towards the shank 110.

Another embodiment of a screw according to the invention is depicted in FIGS. 6 to 8. The screw shown in FIGS. 6 to 8, analogously to the screw of FIGS. 1 and 2, has a somewhat cylindrical shank 410 and on its rear end, there is a load-application element—shown here by way of an example as a screw head 415—that serves to introduce tensile forces into the shank 410. A helical, tapping thread 411 that starts in the area of the front end of the shank 410 is arranged on the circumferential surface of the shank 410.

A squeezing piston 430, shown here as being disk-shaped by way of an example, is situated in front of the front end of the shank 410 and it preferably has a sealing collar 435 as well as thread sections 431 that project radially. A compound reservoir 460 is arranged between the squeezing piston 430 and the shank 410.

Similarly to the embodiment of FIGS. 1 and 2, the embodiment of FIGS. 6 to 8 also has a threaded rod 440 for actuating the squeezing piston 430. The embodiment of FIGS. 6 to 8, however, differs from the embodiment of FIGS. 1 and 2 because of the arrangement of the threaded rod 440. For instance, according to the embodiment of FIGS. 6 to 8, the threaded rod 440 is non-rotatably arranged on the shank 410 of the screw, and the internal thread 439 that accommodates the external thread 441 of the threaded rod 440 in order to form a spindle drive is arranged on the squeezing piston 430. For this purpose, the squeezing piston 430 has a central bore 438 in whose wall the internal thread 439 is provided. Except for the arrangement of the threaded rod 440 and of the internal thread, the squeezing piston 430 of the embodiment shown in FIGS. 6 to 8 can also be configured as depicted in FIGS. 1 and 2, in FIGS. 3 and 4 and/or in FIG. 5.

As shown in FIGS. 7 and 8, for purposes of the non-rotatable coupling to the threaded rod 440, the shank 410 has a front-end cutout 420 into which a projecting mating profile 442 engages with a positive fit at the rear end of the threaded rod 440. In the embodiment shown, the cutout 420 and the mating profile 442 are configured so as to be cruciform. In addition, the shank 410 and the threaded rod 440 can also be glued. The cutout 420 can be, for instance, in the form of embossing. The threaded rod 440 can especially by made of plastic. Preferably, it can be axially compressed so that the screw can also be used in shallow drilled holes.

What is claimed is:

1. A tapping screw comprising:
   a shank with a front end to be inserted into a hole drilled into a substrate, a rear end and at least one thread arranged on the shank; and
   a squeezing piston situated in front of the front end of the shank of the tapping screw, a compound reservoir containing a hardenable compound being provided between the squeezing piston and the shank of the tapping screw.

2. The screw as recited in claim 1 wherein the squeezing piston is joined to the shank by a threaded rod, a spindle drive being formed on the threaded rod and converting a rotation of the shank relative to the squeezing piston into a translatory movement of the squeezing piston relative to the shank.

3. The screw as recited in claim 2 wherein the spindle drive converts the rotation of the shank relative to the squeezing piston in a screwing direction of the at least one thread into a translatory movement as the squeezing piston approaches the shank.

4. The screw as recited in claim 2 wherein the threaded rod is arranged non-rotatably on the squeezing piston, and the shank has an internal thread, the threaded rod being screwed into the internal thread.

5. The screw as recited in claim 2 wherein the threaded rod is arranged non-rotatably on the shank, and the squeezing piston has an internal thread, the threaded rod being screwed into the internal thread.

6. The screw as recited in claim 5 wherein the thread and the shank are separate parts, the thread and the shank being coupled to each other by a non-rotatable plug-in connector.

7. The screw as recited in claim 1 wherein the squeezing piston projects radially beyond the shank, at least in certain sections.

8. The screw as recited in claim 1 wherein the squeezing piston has at least one thread section projecting radially.

9. The screw as recited in claim 1 wherein the squeezing piston has a sealing collar, and in that sections of the front end of the shank are accommodated in the sealing collar.

10. A method for the placement of the screw as recited in claim 1 into a hole drilled into a substrate, the method comprising:
    cutting a mating thread into the substrate with the at least one thread; and
    squeezing compound out of the compound reservoir with the squeezing piston.

11. A screw comprising:
    a shank with a front end to be inserted into a hole drilled into a substrate, a rear end and at least one thread arranged on the shank;
    a squeezing piston situated in front of the front end of the shank, a compound reservoir being provided between the squeezing piston and the shank; and
    a threaded rod arranged non-rotatably on the shank, and the squeezing piston having an internal thread, the threaded rod being screwed into the internal thread.

12. The screw as recited in claim 11 wherein the thread and the shank are separate parts, the thread and the shank being coupled to each other by a non-rotatable plug-in connector.

* * * * *